Feb. 6, 1962 J. W. GRATIAN ETAL 3,020,360
PRONUNCIARY
Filed Jan. 29, 1959 4 Sheets-Sheet 1
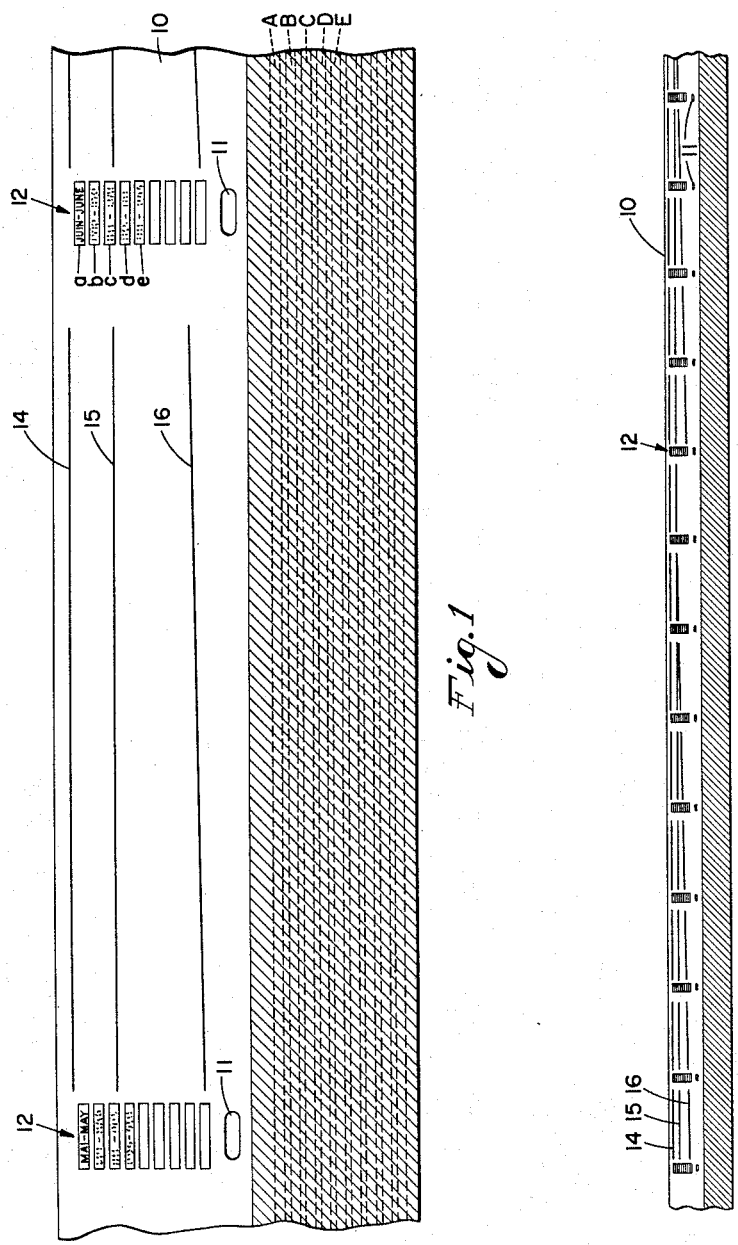
INVENTORS
JOSEPH W. GRATIAN
RICHARD J. O'BRIEN
BY
Richard G. Stahr
ATTORNEY Feb. 6, 1962    J. W. GRATIAN ETAL    3,020,360
PRONUNCIARY
Filed Jan. 29, 1959    4 Sheets-Sheet 2

Feb. 6, 1962     J. W. GRATIAN ETAL     3,020,360
PRONUNCIARY

Filed Jan. 29, 1959     4 Sheets-Sheet 4

United States Patent Office 3,020,360
Patented Feb. 6, 1962

3,020,360
PRONUNCIARY
Joseph W. Gratian and Richard J. O'Brien, Rochester, N.Y., assignors to General Dynamics Corporation, Rochester, N.Y., a corporation of Delaware
Filed Jan. 29, 1959, Ser. No. 789,918
2 Claims. (Cl. 179—100.2)

This invention relates to an educational device. More particularly, the invention relates to a teaching device utilizing magnetic tape.

Vocal recordings have been used to facilitate instruction in foreign languages. These require, however, the use of a separate printed text to illustrate the spelling of the words in the foreign language. Printed texts alone, without separate oral instruction by a teacher or by recordings, fail to impart to a student the accents of a language.

Recently, it has been proposed to use specially prepared slides for the teaching of foreign languages. These slides or cards carry printing in the foreign language and in the known or native language, and in addition, carry a strip of magnetic film on which is impressed magnetically the word, phrase, or phrases that are printed in the foreign language on the slide or card, for audible reproduction, to permit the student to listen to the correct pronunciation of the printed matter while viewing the printed matter. Slides or cards of this type provide a convenient, relatively inexpensive means for making accessible to a student the correct spelling and pronunciation of a large written and spoken vocabulary in the foreign language.

However, cards of this type ordinarily are about ten mils thick. Assuming that one word is placed on one card, a vocabulary of 1800 words would require a storage drawer 18 inches deep. This is an extremely modest vocabulary. To provide a complete pronouncing dictionary, made up of cards or slides of the character described, would require a much larger amount of storage space. Moreover, handling such cards is awkward and cumbersome, the location of a particular desired card in storage can require a prolonged search, and proper refiling of particular cards from storage is tedious.

One object of the present invention is to provide a practical teaching device that is convenient and easy to operate and that will facilitate the study of a foreign language.

Another object of the invention is to provide a pronouncing dictionary apparatus that will facilitate the teaching of foreign languages, and that will permit the storage of a large vocabulary in a space of reasonable volume.

Another object of the invention is to provide a pronouncing dictionary apparatus that will be practical to construct and easy to operate. A related object of the invention is to provide an apparatus of the character described in which any particular word or phrase can be located easily and rapidly.

A further object of the invention is to provide a pronouncing dictionary apparatus, that can be used to reproduce, both in printing and orally, desired bits of information regarding a foreign language, and that can be used selectively for intensive study of particular bits of information in which there is a strong interest.

A more general object of the invention is to provide an information storage device in which a large number of discrete bits of information can be stored separately, in a minimum amount of space, and can be located or retrieved rapidly.

A further object of the invention is to provide an index means whereby separate bits of information, that are stored on tape, can be located rapidly while running the tape at high speed.

Still a further object of the invention is to provide a teaching device that will automatically repeat an item in which there is a particular interest, for as long a period as desired.

A specific object of the invention is to provide a projection and sound reproduction device utilizing a tape having plural channels of printed matter and of corresponding magnetic recordings, and that will permit selection of desired printed matter for projection and automatically will reproduce phonetically the corresponding magnetic recording.

Other objects of the invention will be apparent hereinafter from the specification and from the recital of the appended claims.

We have discovered that a pronouncing dictionary apparatus can be constructed that uses plastic tape for carrying printed indicia for projection, and that carries corresponding magnetic recordings of the printed indicia for phonetic reproduction simultaneously with the projection of the printed indicia. According to a preferred embodiment of our invention, a transparent tape, that is made of a synthetic plastic material, is provided with printed matter that can be projected on a screen, and with a magnetic coating on which is magnetically recorded an audible or phonetic rendition of the printed matter. We print index indicia on the tape comprising a plurality of sloped lines that extend generally lengthwise of the tape, and that are sloped at different slopes transversely of the tape. The relative transverse positions of these lines on the tape can serve to locate and to identify quickly the predetermined location of a particular word or phrase that is printed or recorded magnetically on the tape. This type of index means has general utility for facilitating the retrieval of information from tapes.

We have also discovered one type of apparatus that can be employed in conjunction with the tape, simultaneously to reproduce the printed matter by projection and to reproduce phonetically the magnetic recording that corresponds to the printed matter. In the preferred embodiment of our invention, this apparatus includes scales or other similar means that cooperate with the index indicia on the tape, to permit rapid location of any desired word or other bit of information that is recorded on the tape. Means are also provided to permit the automatic repetition of any word or phrase on the tape, in which there is some particular interest.

In the drawings:

FIG. 1 is a fragmentary top plan view of a tape constructed according to one embodiment of this invention, on an enlarged scale;

FIG. 2 is a fragmentary top plan view thereof, on a less enlarged scale;

Figure 3:
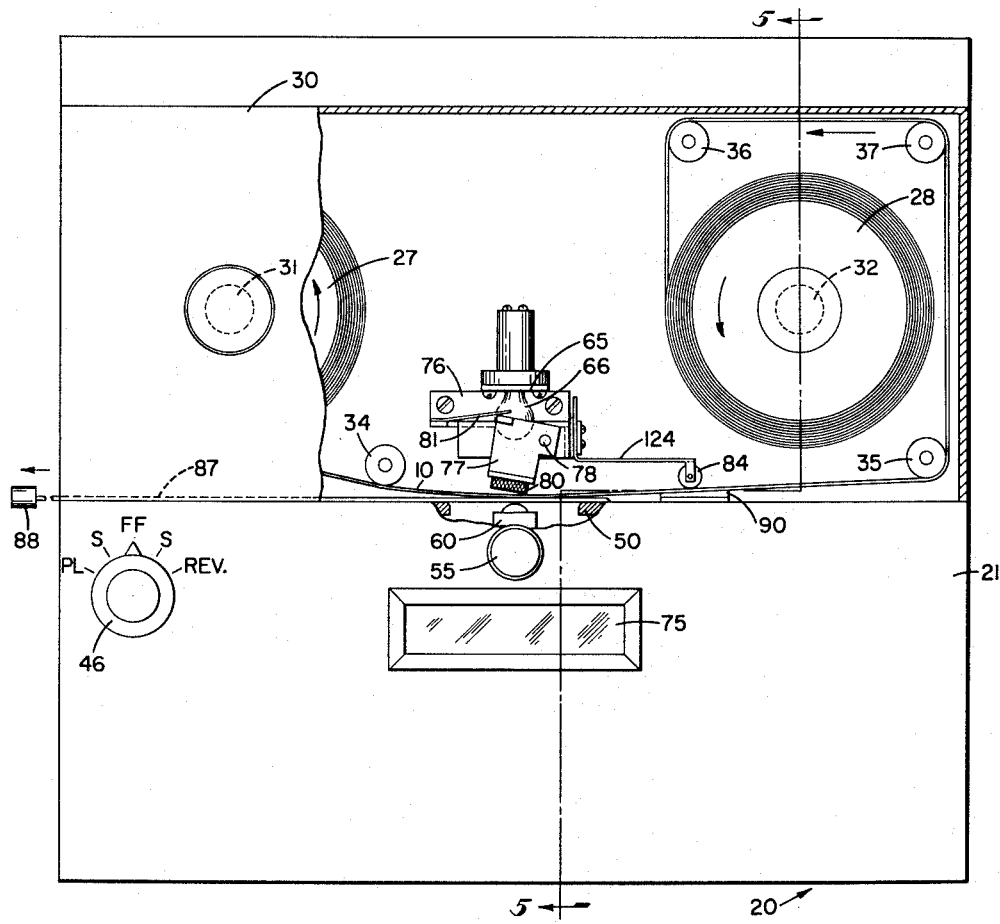
FIG. 3 is a front elevation, partly broken away, of a pronouncing dictionary apparatus that can operate with the tape shown in FIGS. 1 and 2, and that is constructed according to one embodiment of this invention, showing the magnetic head in non-operative, disengaged position.
Figure 4:
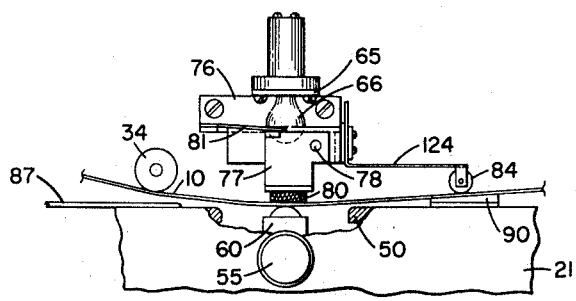
FIG. 4 is a fragmentary front elevation thereof, showing the magnetic head in engaged, operative position.

Referring now in detail to the drawings, and particularly to FIGS. 1 and 2, we provide a tape 10 that is made of a transparent synthetic plastic material, such as, for example, polyethylene or polyester film. A plurality of apertures 11 are formed in lengthwise alignment in the tape 10, at uniformly spaced locations along its length, to form a line of apertures lying approximately along the transverse center of the tape. On one surface of the tape, at one side of the line of apertures 11, there is a coating of high magnetic retentivity, of sufficient width transversely of the tape to provide nine channels A, B, C, D, E, and so on. The magnetic coating is adapted to receive magnetic impressions for recording sounds, and can be any standard magnetically retentive coating material.

On the opposite side of the line of apertures 11, there are, at uniformly spaced intervals, transversely-extending columns 12 of separate items of printed matter. There are nine printed items in each column 12. The nine items of indicia in each column 12 are disposed in alignment, relative to the length of the tape, with the nine items of indicia in each of the other columns 12 along the length of the tape, in channels that are designated respectively a, b, c, d, e, and so on. The items in each channel preferably are arranged sequentially for teaching purposes. For example, referring to FIG. 1, for teaching the names of the months of the year in French, and printed item "a" in the column 12 at the left to FIG. 1 might read "Mai-May," and the corresponding item "a" in the column 12 of indicia at the right of FIG. 1 might identify the succeeding month, "Juin-June." A spoken rendition of the name of the fifth month, in French, or alternatively in French and in English, is recorded as a magnetic impression on track A on the magnetic coating; and similarly, the name of the sixth month is recorded on track A of the magnetic coating displaced lengthwise from the recording of the fifth month by a distance that corresponds to the distance between the columns 12. The location of the magnetic recording ordinarily is displaced lengthwise of the tape 10, relative to the printed item to which it corresponds, as will be made clear as this description proceeds.

On the same transverse portion of the tape as the columns 12 of indicia, there are disposed three index lines; a black line 14, a red line 15, and a blue line 16, referring to FIG. 1. These lines extend generally longitudinally of the tape, but are discontinuous in the sense that they are not superposed on the printed matter in the columns 12. The words "line," "linear indicia," and the like, are employed herein to refer to such index indicia whether continuous or broken. Each line is inclined or sloped transversely of the tape and each has a different slope than that of the other lines. The black line 14 has the least slope. It corresponds to hundreds of words; that is, its transverse position on the tape, relative to the two edges of the tape, changes very slightly from one end of the tape to the other, the change being sufficient only to indicate whether particular columns 12 of printed matter fall within the first one hundred such columns on the tape, or the second hundred columns 12 on the tape, and so on.

The red line 15 has a somewhat steeper slope than the black line 14. Its slope is sufficient to indicate, by its relative transverse position on the tape 10, particular decades of columns 12. The blue line 16 has the greatest slope of the three index lines, and it serves to indicate, by its relative transverse position on the tape 10, the location of a particular column 12 of indicia within a given decade of columns.

As shown in FIG. 2, the slope of the blue line 16 is such that within each decade of tape, in the illustrated preferred embodiment of this invention, the blue line 16 overlaps the red line 15, and both the red and blue lines, if extended sufficiently, would soon go off the tape. It is therefore necessary to form the blue index line, at least, and usually also the red index line, as a plurality of separate, relatively short lines that are parallel to each other, that do not overlap, and that are sloped at the same slope transversely of the tape 10. Disregarding the fact that the index lines are interrupted so as not to overlap the printed items, the length of each of the several parallel blue index lines 16 corresponds to the length of the tape that is allotted to each decade of columns 12. The fragment of the tape that is shown in FIG. 2 is too short to illustrate that the red index line 15 also may be made up of a plurality of parallel lines, since the length of each red index line 15 corresponds to the length of tape that is allotted to one hundred of the columns 12. With a very long tape containing several hundred columns 12, there would be one red index line corresponding to each one hundred columns 12, and each of these index lines would be parallel to each other and to each of the other red index lines.

In a preferred embodiment of the invention, the tape is approximately 2" in width, and the spacing between successive printed columns 12 is on the order of 6", and the blue index line 16, designating units, has a slope of approximately 1" per 10 columns; the red line 15 has a slope of approximately 1" per 100 columns; and the black line 14 has a slope of approximately $\frac{1}{16}$" per 100 columns. Approximately 199 columns 12 of printed matter, so spaced, can be accommodated on commercially available tape of this type, with nine separate items a, b, c, d, e, and so on, in each column 12, and with nine corresponding magnetic tracks A, B, C, D, E and so on, on the coated portion of the tape. Any particular column 12 of items of printed matter can be located accurately, at any point along the length of the tape, by measuring the relative transverse positions on the tape of the three index lines 14, 15, and 16. However, we prefer to use tape of this type in a magazine in which the index indicia can be viewed through windows with graduated scales to cooperate with the index lines, automatically to indicate by number the identity of the column 12 that is disposed at the recording head and viewer of the machine, as will be described presently.

The reproduction apparatus, in which the tape is employed, comprises a casing 20 having a generally L-shaped frame. The front side 21 of the casing 20 is integral with an apron 22 that is horizontally disposed and that extends rearwardly of the apparatus. At its rear end, the apron 22 is formed with a downwardly depending portion 24 that is secured to an upstanding, thick wall 25. Sheet metal members, generally indicated at 26, are secured to the wall 25 and to the front side 21 to enclose the casing.

The tape 10 is wound on two reels 27, 28, respectively, and is enclosed in a magazine 30. The magazine slides into position over the apron 22, and two reel drive shafts 31, 32, respectively, extend into the magazine and lock onto the hubs of the reels. These shafts 31, 32, project through bearings 47 that are mounted in the wall 25, to be driven by a suitable drive mechanism (not shown). A pair of idler rolls 34, 35, are rotatably mounted within the magazine, to guide the tape 10 through a predetermined path as shown in FIG. 3. Other idler rolls 36, 37, are provided adjacent the reel 28, to guide the tape 10 through another part of its path.

Figure 5:
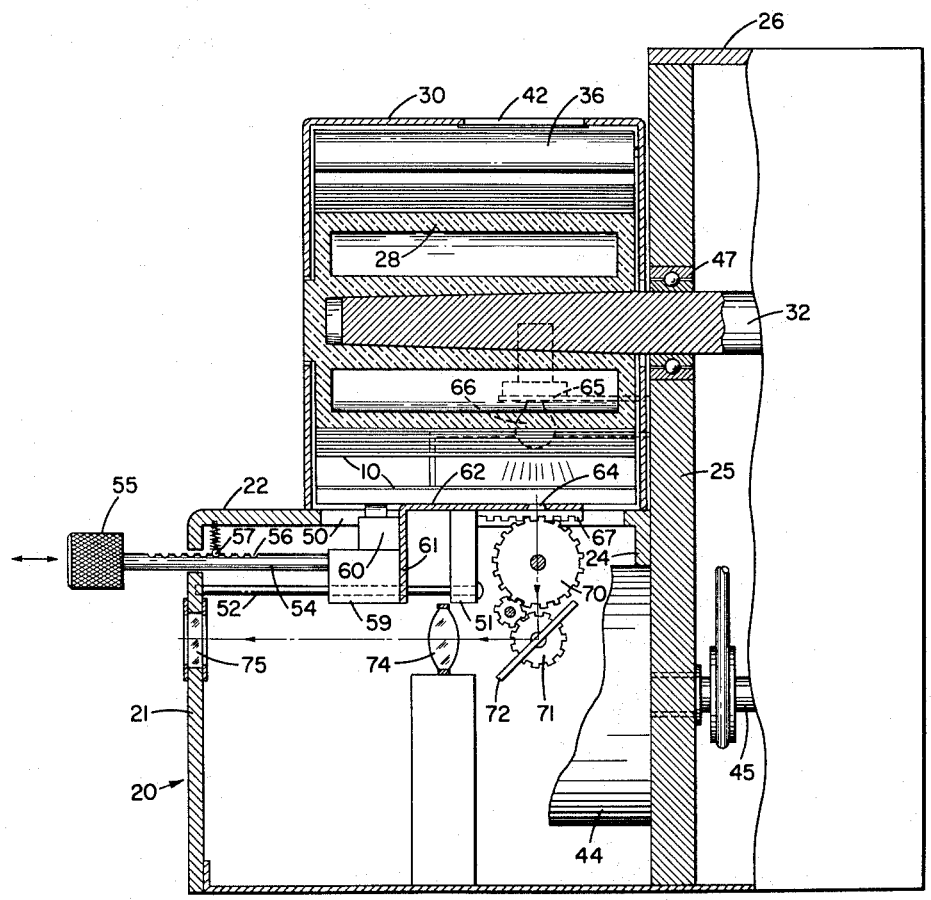
FIG. 5 is a section taken on the line 5—5 of FIG. 3, looking in the direction of the arrows.
Figure 6:
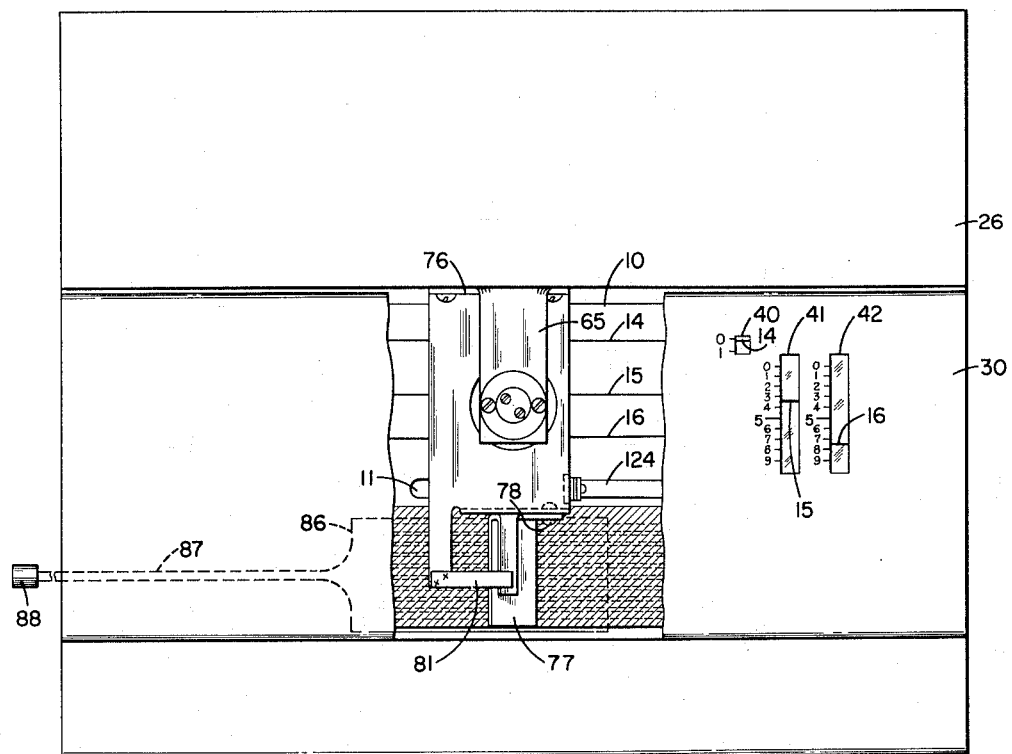
FIG. 6 is a top plan view thereof.

The housing of the magazine 30 is formed with a plurality of windows 40, 41, 42 (FIGS. 5 and 6). A small pane of clear glass may be mounted in the window 40, or it may be left empty. Light filters are mounted in the windows 41, 42, respectively, so that through the window 41, only the red index line 15 is visible, and through the window 42, only the blue index line 16 is visible. Numerical graduations are formed on the magazine housing adjacent each window, so that the respective index lines indicate by a numerical value the relative position of the tape in the apparatus.

A motor 44 is mounted in the casing 20, beneath the apron 22, with its armature shaft 45 projecting through the wall 25, to actuate a drive mechanism (not shown) to drive the shafts 31, 32, in the desired direction. Any standard drive system can be employed, including a manual system, but we prefer to use an automatic drive actuated by the electric motor 44, and that provides a choice of speeds at which the tape can be driven, such as, for example, playback, stop, fast forward, a second stop position, and reverse. Preferably, a knob 46 is rotatably mounted with its shaft projecting through the front side 21 of the casing 20, to operate clutch and brake mechanism, and the knob 46 is provided with a pointer to cooperate with indicia as shown in FIG. 3, indicating the several speeds already described, to facilitate operation of the apparatus at the desired speed.

The apron 22 is formed with a slot 50 that extends transversely of the tape at least for the full width of the tape, and that is disposed centrally of the apron 22 between the two tape reels in the magazine. A yoke 51 is secured to the apron 22 at both sides of the slot 50, and extends across the slot. A pair of rods 52 (FIG. 5) are secured at their rear ends to the yoke 51, and at their front ends to the front side 21 of the casing. A block 59, that is formed with a pair of holes through which the two rods 52 are passed, is slidably mounted on the rods 52. A shaft 54 is secured to the block 59 and projects through an aperture in the front side 21 of the casing. A knurled knob 55 is secured to the projecting outer end of the shaft 54. Nine uniformly spaced recesses 56 are formed in the upper surface of the shaft 54. A spring-pressed ball 57 is disposed to engage in one of these recesses 56, to hold the shaft 54 at any selected position.

A magnetic head 60 is mounted on the block 59, and a piece of angled sheet metal 61 is secured to the rear of the block 59, to provide a table 62 that is movable transversely of the path of the tape, upon adjustment of the position of the block 59 by shifting the knob 55. The table 62 is formed with a slot 64 for a purpose to be described presently. The slot 64, and the magnetic head 60, are spaced apart by a predetermined distance that is equal to the distance between a printed item in printed channel "a," and its corresponding magnetic channel A on the tape 10. To select a particular channel of printing, and its corresponding magnetic channel, the knob 55 is moved in or out, to adjust the position of the magnetic head 60 and the associated table 62 transversely of the tape.

Referring particularly to FIG. 5, a bracket 65 is secured to the wall 25, and a light bulb 66 is mounted on the bracket 65 to cast its rays downwardly toward the table 62, and particularly toward the slot 64 in the table. A rack 67 is mounted on the undersurface of the table 62, and a pinion 70 is mounted to be rotated upon reciprocation of the rack 67. Another pinion 71 is mounted within the apparatus casing to be rotated upon rotation of the pinion 70, and a mirror 72 is secured to a shaft that is coaxial with the pinion 71, for inclination upon rotation of the gear 71. The mirror 72 is disposed beneath the slot 64, to receive the projection of printed item on the tape 10, that is disposed above the slot 64, and that is projected onto the mirror 72 by the light from the bulb 66. A magnifying lens 74 is mounted within the apparatus casing to magnify the image that is reflected from the mirror 72 and to project the magnified image onto a frosted glass screen 75 that is mounted in an opening in the front side 21 of the casing.

A bracket 76 is secured to the front of the wall 25, and a bracket 77 is mounted for pivotal movement on a pin 78 that is secured to the bracket 76. A resilient pressure pad 80 is mounted on the lower face of the bracket 77, in position to press the tape 10 against the magnetic head 60. A spring 81 is mounted on the bracket 76, constantly to urge the bracket 77 in one direction about its pivot pin 78.

A resilient member 124 is secured at one of its ends to the bracket 76, and a roller or contact member 84 is mounted at its other end and is disposed resiliently to press the tape 10 downwardly against a contact plate 90 that is mounted on the upper surface of the apron 22.

A slide 86 is disposed along the upper surface of the apron 22, and is connected by a shaft 87 to a knob 88 that projects to one side of the apparatus casing. The slide 86 can be interposed between the magnetic head 60 and the tape 10, as shown in FIG. 3, when the tape is being reversed or moved forward at fast speed. By shifting the knob 88 to the left relative to FIG. 3, the slide 86 can be withdrawn from between the magnetic head 60 and the tape, to permit playback from the tape.

To use this apparatus and tape for the study of the French language, the tape, as illustrated in FIGS. 1 and 2, is wound on one of the reels in the magazine, and the magazine is placed in position on the apparatus. The knob 88 is shifted to the left relative to FIG. 3, to withdraw the slide 86 from between the magnetic playback head 60 and the tape 10. The knob 55 is also shifted to position the magnetic playback head 60, and the elongate slot 64 in the movable table 62 beneath their respective desired magnetic channel and printed channel. For example, to study the months of the year with the tape shown in FIG. 1, the printed channel "a" is selected, and when the knob 55 is shifted to move the slot 64 beneath channel "a," the magnetic head 60 is automatically positioned beneath the proper magnetic channel "A." Light from the bulb 66 passes through the tape and causes the printed matter in channel "a" to be projected upon the mirror 72, and to be reflected from the mirror 72 through the lens 74 and onto the screen 75, where it can be viewed by the user of the apparatus.

For example, when the printed matter, "Mai-May", on the tape 10 passes over the slot 64, it is projected through the slot onto the mirror 72, and reflected from the mirror, through the lens 74 and onto the screen 75.

The teeth of the rack 67, and of the pinions 70 and 71, are arranged so that when the table 62 is moved from one horizontal position to another, the angle of incidence of the projection of the printed indicia from the tape 10 onto the mirror 72 is changed by a sufficient amount so that the image that is reflected from the mirror 72 always passes through the lens 74 and falls on the screen 75. As the printed indicia is projected onto the screen 75, the recording head 60 plays back the material that is recorded on the magnetic channel with which the head is associated. The audio reproduction system can be any standard system that is operated from the magnetic head 60.

It will be appreciated that lens systems may be employed instead of the single lens 74 illustrated in the drawing. Similarly, the tape 10 may have any desired number of printed items in each column, together with a corresponding number of magnetically retentive channels. Other types of information than foreign languages can also be stored on the tapes.

We prefer that the tape be driven directly from reel to reel, without the use of a capstan and pressure roller. With tapes of the type that we have described, with a 6" spacing, for example, between the printed columns, and 199 columns on a tape, there is such a small tape pileup that the small change in speed due to change in diameter is not objectionable in the reproduction of speech. The fast forward and fast reverse speeds, which we prefer to provide in the apparatus, permit rapid rewind of the tape, and also permit rapid location of a particular printed column through use of our index means.

The index lines for a particular printed column are displaced lengthwise on the tape by a distance equal to the distance between the windows 40, 41, and 42, and the magnetic playback head 60. Thus, when it is desired to locate a column of indicia that is identified by the number 37, for example, the tape is run either in the forward or in the reverse direction, whichever is faster, until the lines indicate that the printed column 37 is juxtaposed with the magnetic head. The lines then will occupy approximately the position shown in FIG. 6, in which the black line 14, in its window 40, lies between the 0 and 1, indicating that the column of indicia at the magnetic head 60 has an identifying number below 100; the red line 15 is visible in its window 41 and intersects the graduations along the side of the window between the "3" and the "4", indicating that the identifying number of the printed column at the magnetic head is numbered between 30 and 40; and the blue line 16 is visible through its window 42 in a position between the numbers "7" and "8" in the graduations alongside that window, indicating that the units number "7" identifies the particular printed column within the 30 decade that is disposed on the tape at the magnetic head 60.

To identify information in a multiple magazine system for information storage, a code system can be used involving, for example, an identifying number for the magazine, a letter for the channel on the tape in that magazine, and a number for the bit location on that channel. For example, the number 30–A–197 can be used to identify information bit 197 on channel A of magazine 30. Either "A" or "a" can be used to identify the same channel.

Figure 7:
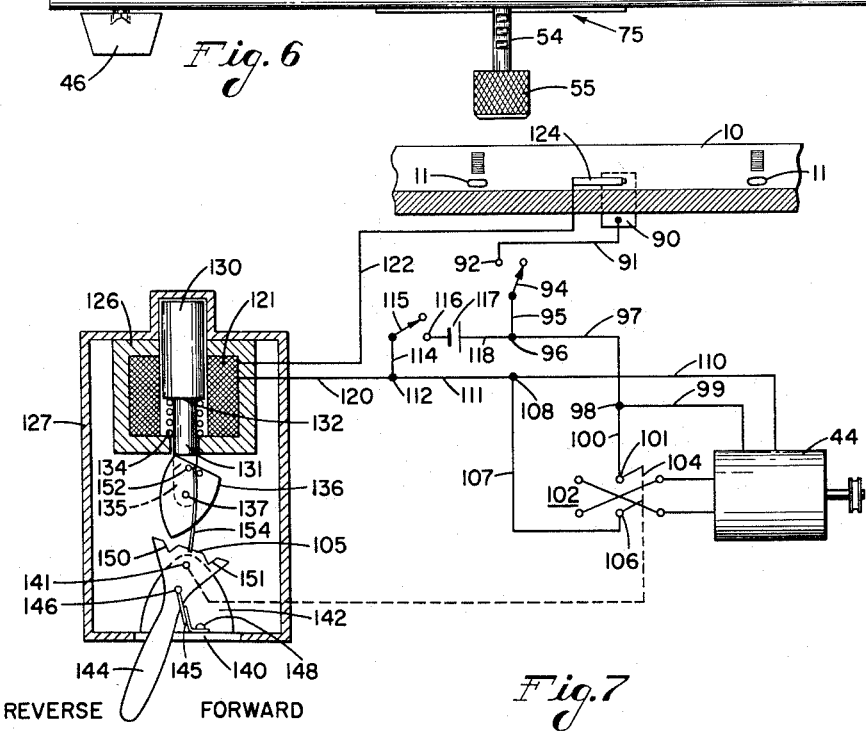
FIG. 7 is a schematic diagram showing one way in which a reversing mechanism can be wired, to permit repetition of a single word or phrase if desired.

To permit repetition of any phrase in which there is a particular interest, an automatic repeat mechanism is provided that employs the apertures or holes 11 in the tape as an actuating means. The contact plate 90, previously described, is metallic and forms a part of an electrical circuit. The plate 90 is connected by a line 91 to one terminal 92 of a control switch, the armature 94 of which is shown in FIG. 7 in its open position. The armature 94 of the control switch is connected through a line 95 to a junction 96. One branch of the junction 96 is connected by a line 97 to another junction 98. This junction is connected through one line 99 to a D.C. motor 44, and through a second line 100 to one terminal 101 of a double pole, double throw switch 102.

The four terminals of this switch 102 are connected so that when the armature 104 of the switch is closed in one direction, the motor 44 is operated in one direction of rotation, and when the switch is closed through the other two terminals, the motor 44 is operated in the other direction. The armature 104 is connected mechanically, as indicated by the dotted line in FIG. 7, to a toggle arm 105, for movement upon movement of the toggle arm. The second terminal 106 of the armature 104 is connected through the line 107 with a junction 108. The junction 108 is connected through one line 110 with one winding of the D.C. motor 44, and through a second line 111 with a junction 112. The junction 112 is connected through one line 114 with the armature 115 of a master switch. The terminal 116, with which the armature 115 cooperates, is connected with one electrode of a battery 117, and the opposite electrode of the battery 117 is connected through a line 118 with the junction 96. The junction 112 is connected through another line 120 with a solenoid 121, which in turn is connected through a line 122 with the contact member 124 and its roller 84. The roller 84 is mounted to engage against the upper surface of the tape 10, to make electrical contact with the plate 90 whenever one of the apertures 11 is disposed to permit contact.

The solenoid coil 121 is mounted within a housing 126, which in turn is mounted within a larger casing 127. The solenoid 121 is generally cylindrical in shape, and an iron core 130 is mounted for reciprocatory movement within the bore of the solenoid 121. The core 130 is formed with a reduced portion 131, to provide a shoulder 132. The reduced portion 131 projects through an opening in the housing 126. A spring 134 is interposed between the shoulder 132 and the portion of the housing 126 about the opening through which the reduced portion 131 projects, constantly to urge the core 130 in one direction. The reduced portion 131 is formed with an extension 135 that is stepped downwardly from the reduced portion 131. A generally triangular shaped member 136 is mounted on the extension 135 for pivotal movement about a pin 137. The casing 127 is formed at its front end with an aperture 140, and within the casing 127 adjacent this opening 140, the toggle arm 105 is mounted for pivotal movement about a pivot pin 141 that is secured to a generally triangular support 142. The toggle arm 105 is formed with a portion 144 that projects through the aperture 140. A hairpin spring 145 is interposed between a pin 146 that is mounted on the portion 144 of the toggle arm, and a pin 148 on the front portion of the casing 127, constantly to urge the toggle arm in one direction or the other about its pivot 141.

The rear face of the toggle arm 105 is formed with a pair of notches 150, 151, that are spaced from each other on either side of the pivot 141, and that are formed to receive the apex of the generally triangular, pivotally mounted member 136. The member 136 is formed with a pair of pins 152 on its upper surface, and a leaf spring 154, that is secured to the front face of the toggle 105 between the notches 150, 151, is disposed with its free end projecting between these pins, constantly to urge the member 136 in one direction or the other, depending upon which pin the leaf spring engages.

In normal operation of the apparatus, the master switch armature 115 is closed, and the automatic repeat mechanism control switch armature 94 is in the open position. The toggle arm 105 is either in the forward or reverse position, depending upon the direction in which the tape should be moved. This arm is adjustable manually. The armature 104 of the D.C. motor switch is in one of its two closed positions, to operate the tape winding mechanism to wind the tape either in the reverse or forward direction, depending on the setting of the toggle arm 105. Therefore, in normal operation of the device, the motor is in continuous operation in one direction or the other so long as the master switch armature 115 is in its closed position. The manual control knob 46 preferably operates the clutch and brake mechanism (not shown) that serve to drive the reels at different speeds and in different directions, and to stop the reels.

The automatic repeat mechanism can be operated to repeat a particular word or phrase on the tape 10 continuously and automatically. To operate this mechanism, the control switch armature 94 is closed. The tape will continue its movement in the direction in which it was moving before the switch was closed, until electrical contact is established between the contact arm 124 and its roller 84, and the plate 90, which occurs as soon as one of the apertures 11 in the tape is moved into position to permit electrical contact to be made between these two elements. When this electrical contact is established, a circuit is closed from the contact plate 90, through the line 91, the terminal 92, the armature 94, the line 95, and the junction 96, the line 118, the battery 117, the junction 116, the armature 115, the line 114, the junction 112, and the line 120, the solenoid 121, and the line 122, to the contact arm 121 and its roller 84, to energize the solenoid 121. When the solenoid 121 is energized, the core 130 is forced to move to the lower part of the housing 126 relative to FIG. 7, to compress the spring 134, and to force the apex of the member 136 into the notch 150 in the toggle arm; and as the core 130 continues its movement into the core of the solenoid, the member 136 forces the toggle arm 105 to pivot about its pin 141, to cause it to move in a counterclockwise direction relative to FIG. 7.

When the toggle arm 105 is shifted about its pivot 141 counterclockwise, from the reverse to the forward position, the armature 104 of the motor control switch is mechanically shifted from one position to the other, to change the direction of rotation of the motor. This causes the tape to be moved in the forward direction. As soon as the tape begins its movement, electrical contact between the contact arm 124 and the plate 90 is broken, and the solenoid is deenergized, and the spring 134 expands to return the core 130 to the position shown in FIG. 7.

When the toggle arm 105 pivots in a counterclockwise direction, the leaf spring 154 is shifted so that it engages against the pin 152 that is disposed on the left side of the member 136, relative to FIG. 7. When the core 130 is returned to the position shown in FIG. 7, upon expansion of the spring 134, the member 136 is returned rearwardly with the core 130, but because of the engagement of the leaf spring 154 against the left pin 152, the member 136 is pivoted further in a counterclockwise direction as the toggle arm is disengaged.

Movement of the tape in a forward direction continues until the aperture 11 at the forward end of the particular phrase, that is to be repeated, is disposed again to permit electrical contact to be made between the contact arm 124 and the plate 90. When electrical contact between these two parts is again made, the solenoid is again energized, and the core 130 is moved to the lower end of the casing 127, again forcing the member 136 downwardly, this time to engage in the notch 151 in the toggle arm 105, to cause the toggle arm to pivot in a clockwise direction, to throw the armature 104 of the motor switch to cause the motor to be driven in the reverse direction. This process will continue automatically until the entire apparatus is turned off by moving the armature 150 into its open position, or alternatively, until the automatic repeat switch armature 94 is moved to its open position.

The automatic repeat mechanism, that we have described, provides one preferred means for the automatic repetition of any phrase in which the user of the apparatus is particularly interested. An A.C. power source, and a reversible A.C. motor, either universal or capacitor, could be used instead of a D.C. motor as shown above. Instead of holes in the tape, we can use metallic foil inserts, or pieces of metallic foil that are secured to one surface of the tape as the holes are spaced, for cooperation with electrodes that are disposed resiliently to engage the same surface of the tape and to complete a circuit between the electrodes when both engage the same piece of foil. In either of these last-mentioned cases, the foil pieces could have approximately the same size as the holes 11. Strong magnetic pulses, impressed on a magnetic coating, could also be employed to actuate a reversing mechanism. Other modifications could be made within the scope of our invention by those skilled in the art.

While the invention has been described in connection with a specific embodiment thereof, it will be understood that it is capable of further modification, and this application is intended to cover any variations, uses, or adaptations following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. In combination, an elongate tape of a transparent synthetic plastic material having along one transverse portion thereof a longitudinally extending magnetically retentive coating that provides a plurality of longitudinally extending channels for the reception of phonetically reproducible magnetic impressions, and having a plurality of channels of printed matter disposed on the uncoated portion of said tape, said printed matter comprising a plurality of separate bits of information, there being a magnetic impression on said tape associated with and corresponding to each said bit, the magnetic impressions being arranged in substantially uniform transverse and lengthwise relation to their corresponding bits, and apparatus for simultaneously permitting visual reproduction of a particular bit and phonetic reproduction of the corresponding magnetic impression comprising motive means for moving the tape through a lengthwise path, a light source disposed on one side of said path for projecting light through the uncoated portion of said tape to provide an image of the printed matter thereon, a table mounted for movement transversely of said tape, said table being formed with a window and being mounted for movement on one side of said tape to permit projection from said tape of the image of only the portion of one channel of the printed matter containing said particular bit, and a transducer head secured to said table in fixed relation to said window to sense, in the one channel of said coating corresponding to the channel of said particular bit of printed matter, the magnetic impression that corresponds to said particular bit, in which said printed matter is disposed in transversely extending columns that are uniformly spaced along the length of said tape, and index means disposed on the uncoated portion of said tape between said columns, said index means comprising first linear indicia that extends generally lengthwise of said tape and is sloped transversely of said tape, and second linear indicia comprising a plurality of shorter, parallel uniformly spaced and generally lengthwise-extending straight lines that are sloped transversely of said tape, at a different slope than said first linear indicia, said second indicia lines being associated respectively with groups of sequential columns of printed matter on said tape, whereby the relative transverse position of said first indicia at a given point along the length of said tape can serve to identify a particular group of sequential columns, and the relative transverse position of the associated line of said second indicia can serve to identify a particular column within said group.

2. The combination of claim 1 in which said index indicia are of different colors, and in which said apparatus includes a pair of closely spaced windows through which the index indicia are visible, filter media mounted in said windows to render visible through the respective windows said first index indicia only in one window and said second index indicia only in the other window, and graduations adjacent said windows respectively with which said index indicia cooperate respectively to indicate the relative transverse positions on said tape of the portions of said index indicia that are visible through said window.

References Cited in the file of this patent

UNITED STATES PATENTS

| | | |
|---|---|---|
| 1,701,048 | Lummerzhein | Feb. 5, 1929 |
| 1,920,259 | Jackson | Aug. 1, 1933 |
| 2,069,631 | Thomas | Feb. 2, 1937 |
| 2,322,489 | Von Madaler | June 22, 1943 |
| 2,422,143 | Somers et al. | June 10, 1947 |
| 2,598,947 | Thielen | June 3, 1952 |
| 2,637,785 | Charlin | May 5, 1953 |
| 2,650,097 | Erdos | Aug. 25, 1953 |
| 2,703,714 | Demby et al. | Mar. 8, 1955 |
| 2,761,351 | Gehring et al. | Sept. 4, 1956 |
| 2,782,043 | Andrews | Feb. 19, 1957 |
| 2,877,012 | Angel et al. | Mar. 10, 1959 |
| 2,900,142 | Sprinkle | Aug. 18, 1959 |
| 2,945,307 | Kallmann | July 19, 1960 |

FOREIGN PATENTS

| | | |
|---|---|---|
| 589,823 | Great Britain | July 1, 1947 |